United States Patent [19]

Allsop et al.

[11] Patent Number: 4,850,031
[45] Date of Patent: Jul. 18, 1989

[54] AVALANCHE VICTIM LOCATING APPARATUS

[76] Inventors: Jon I. Allsop, 317 Chuckanut Point Rd., Bellingham, Wash. 98225; Gerald J. Mc Morrow, 11810 N.E. 102 Pl., Kirkland, Wash. 98033

[21] Appl. No.: 144,424

[22] Filed: Jan. 15, 1988

[51] Int. Cl.$^4$ ............................................. G01S 5/02
[52] U.S. Cl. .................................. 455/49; 340/573; 343/725; 455/88; 455/89; 455/90
[58] Field of Search ................ 455/39, 49, 57, 90, 455/89, 88, 83, 79, 78, 53; 342/419; 343/702, 725, 757, 760; 340/573

[56] References Cited

U.S. PATENT DOCUMENTS

| | | |
|---|---|---|
| 3,777,267 | 12/1973 | Van der Floe et al. ........... 455/89 X |
| 3,806,936 | 4/1974 | Koster ............................... 455/89 X |
| 4,045,799 | 8/1977 | Dapiran ............................. 455/89 X |

Primary Examiner—Jerry W. Myracle
Attorney, Agent, or Firm—Mason, Kolehmainen, Rathburn & Wyss

[57] ABSTRACT

An avalanche rescue system in which reliable triggering conserves power and permits a high power alarm to be transmitted from a victim to a survivor. Triggering is provided by light sensitive elements on the user, or by a signal transmitted from a survivor. Microprocessor control synchronizes VHF information signal transmission and burst microwave transmission from a victim as well as received signal processing by a survivor. A directional multiple antenna array is switched to provide directional signals displayed to the survivor. A garment is used to affix the system to the person of the user. A unit includes a case and a cover, and the directional antenna array is extended when the cover is opened.

18 Claims, 4 Drawing Sheets

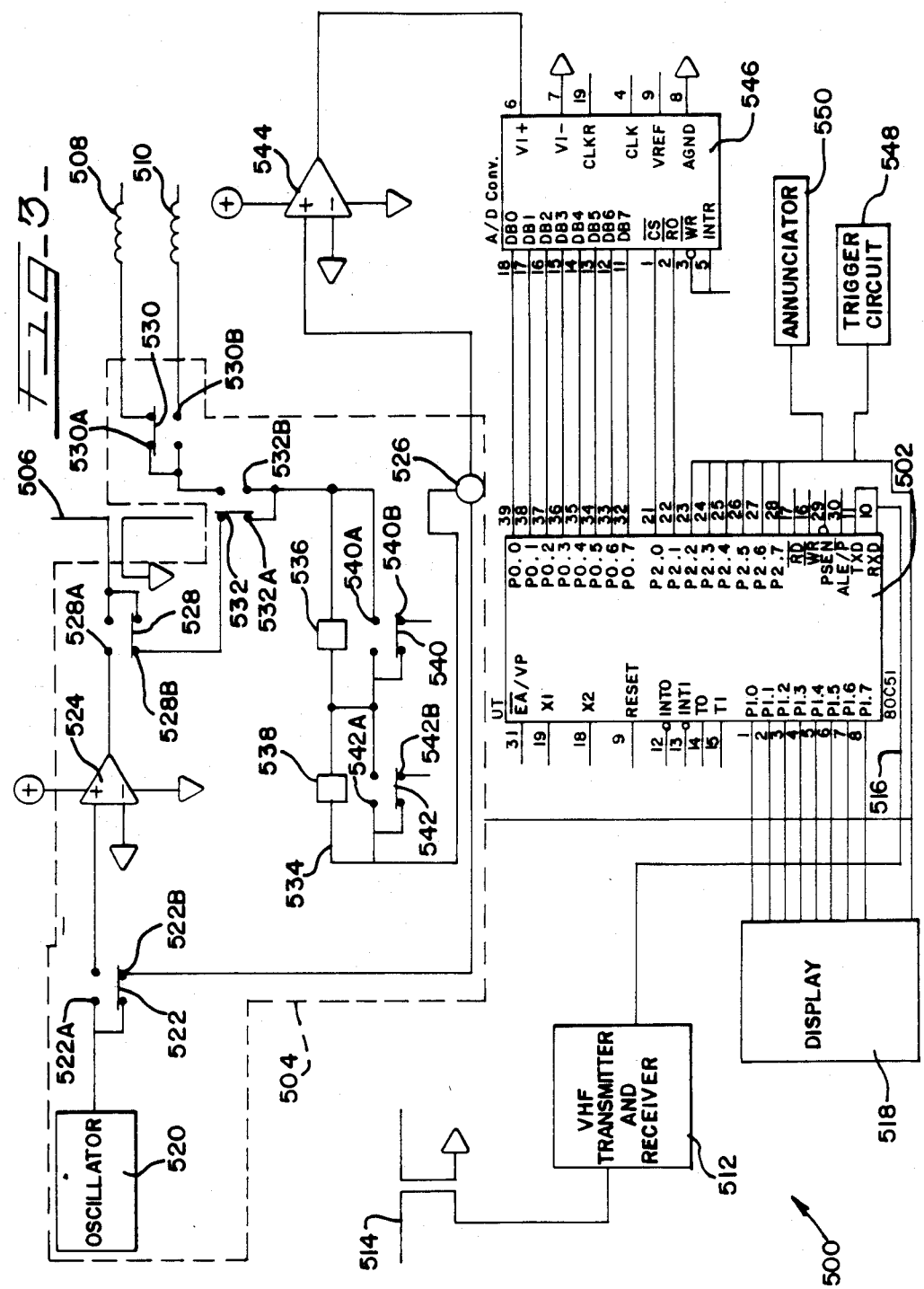

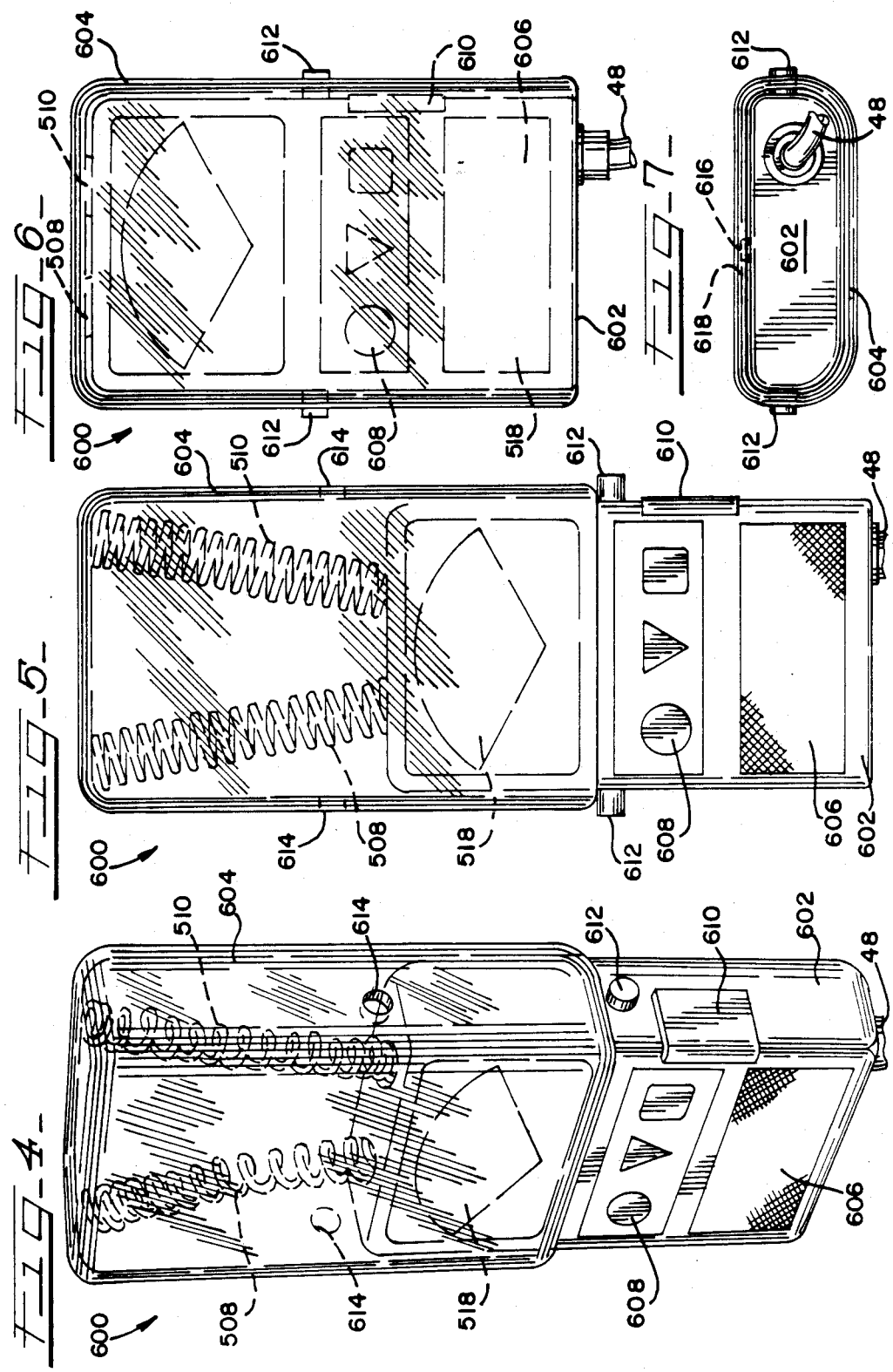

AVALANCHE VICTIM LOCATING APPARATUS

The present invention relates to equipment for finding victims buried in snow, and more particularly to improvements in systems for detecting snow burial and to improvements in alarm systems and transceivers for rescue.

BACKGROUND OF THE INVENTION

Avalanches pose an extremely grave danger for skiers, climbers, military personnel and others in mountain regions during winter and spring. Death or serious injury can result when a person is buried in snow unless rescue is quickly effected. Rescue is difficult because a person buried in an avalanche cannot be seen, may be moved by the avalanche away from the last visible position and cannot easily be located. Suffocation, hypothermia and cardiac arrest, coupled with shock, become more likely the longer the victim is buried. The amount of time spent in locating a victim is an important factor in the probability that the victim will not survive or will be severely injured.

In an attempt to address these problems, electronic locating systems are increasingly being used, for example, by the ski industry and the military. With one type of system presently in use, each member of a group exposed to avalanche danger is supplied with a continuously energized, battery powered radio transceiver unit operating continuously in a transmitting mode. With these known systems, continuous transmission is relied upon to assure that transmission occurs when a victim is buried. If part of the group is buried in an avalanche, the remaining members switch their units to a receiving mode and attempt to locate buried individuals by variations in transmitted signal strength.

This type of system has serious drawbacks. Power output is limited because of the battery drain during continuous operation. Since the units must be easily portable and battery weight is limited, the use of high power alarm signals is impractical. The long wavelength transmission frequencies of these conventional units provide a non directional signal. In order to find a buried victim, it is necessary to move about, preferably in a grid pattern, while attempting to detect increases and decreases in signal strength. This can be difficult and time consuming, particularly in the unfavorable terrain common to avalanche sites. The difficulty is compounded by the fact that survivors are often confused or in shock. In addition, if multiple victims are buried, the region of maximum signal strength may not coincide with the location of a victim. Power consumption and the necessity for continuous transmission prevent the use of an audible alarm that would be useful when a survivor is in relatively close proximity to a victim.

Another type of system currently in use relies on reflected microwave signal detection rather than radio transmission. Each member of a group wears a reflector such as a simple dipole antenna coupled to a diode. A powerful microwave transceiver unit is used to scan the area of an avalanche with a beam of energy. Reflection or backscatter of energy at the second harmonic frequency indicates the presence of a buried victim. One problem is that a transceiver unit of this type is very expensive and, due to the energy required, is too bulky and heavy to be easily transported by a skier or climber. It is not practical for each member of the group to carry a transceiver unit, and the benefit of each survivor being able to search immediately and electronically for victims is lost. Following an avalanche, it may be necessary to transport the radar unit from a distance, and the lost time can result in death or injury of the victims.

SUMMARY OF THE INVENTION

Among the primary objects of the present invention are to provide improvements in triggering systems, alarm systems and transceiver systems for use in rescue operations; to provide an improved radio transceiver avalanche victim detection system; to provide a system that is compact and inexpensive so that each member of a group can conveniently wear the system and have victim search capability; to provide systems in which continuous transmission is not required and relatively high power alarm signals are possible; to provide an improved trigger system making it possible to normally maintain an alarm device or transceiver in a unenergized condition; to provide a system capable of using a relatively high power and highly directional signal; to provide systems that are compact, light in weight and convenient to use; to provide improvements in radio signal direction finding devices; to provide transceiver rescue devices and systems making use of different frequencies and types of transmitted signals; and to overcome problems encountered with known triggering, alarm and transceiver rescue systems thereby to reduce the likelihood of death or injury to victims of avalanches or other accidents.

In brief, in accordance with the present invention, there is provided avalanche victim rescue apparatus for detecting snow burial of a user including an outer garment to be worn by the user. First and second light responsive devices are secured to the garment in spaced apart exposed positions for detecting light striking the user from two different directions. Circuitry attached to the garment connects the light responsive devices to a control unit. The control unit responds to the simultaneous existence of a predetermined light condition at both the first and second light responsive devices for generating an alarm signal.

In accordance with another aspect of the invention, there is provided a rescue alarm system adapted to be fixed to the person of a user and including a portable power supply. An alarm circuit includes means for transmitting an alarm signal in response to energization of the alarm circuit. A control circuit is coupled to the alarm circuit and the power supply for normally maintaining the alarm circuit in an unenergized condition. The control circuit connects the power supply to the alarm circuit to energize the alarm circuit in response to a trigger signal. A trigger circuit is coupled to the control circuit for applying a trigger signal to the control circuit to energize the alarm circuit. The trigger circuit includes trigger means for operating the trigger circuit in response to a predetermined event.

In accordance with a further aspect of the invention, there is provided a snow rescue alarm system for a group of users exposed to avalanche danger. A plurality of rescue alarm devices are worn by the users. Each device includes a portable power supply, an alarm signal generator and a control circuit normally disabling the alarm signal generator. A triggering circuit in each device operates in response to a trigger signal for activating the control circuit to enable the alarm signal generator. A radio transmitter is incorporated in each device. A switch in each device can be operated by survivors following an avalanche to operate the radio transmitter for transmitting a trigger signal to others of the devices to trigger the alarms.

Another feature of the present invention is a rescue transceiver including a case. A manually operable control device such as a switch is disposed upon the surface of the case. An antenna is mounted upon the case for movement between a retracted position and an extended position. A cover mounted over the case normally encloses at least a substantial portion of the case. The cover is movable relative to the case between a standby position in which the cover overlies the control device and an operating position in which the control device is exposed. The antenna moves from the retracted position to the extended position in response to movement of the cover from the standby position to the operating position.

Other features of the invention relate to an improved emergency rescue transceiver system including transmitting means operating at first and second frequencies for transmitting information signals and directional signals, and to a rescue radio system with an improved direction finding apparatus in which multiple aimed antennas are sequentially switched for processing by a logic circuit.

DESCRIPTION OF THE VIEWS OF THE DRAWING

The present invention, together with the above and other objects of the invention, may best be understood with reference to the following description of the embodiments of the invention shown in the accompanying drawings, wherein:

FIG. 3 is a schematic and functional block diagram of another alarm system incorporating features of the present invention;

FIG. 4 is a perspective view of a system unit for an alarm system in accordance with the present invention;

FIG. 5 is a front view of the unit of FIG. 4;

FIG. 6 is a view like FIG. 5 showing the unit in the standby, closed position;

FIG. 7 is a bottom view of the unit of FIG. 6;

DETAILED DESCRIPTION OF THE ILLUSTRATED EMBODIMENTS

Figure 1:
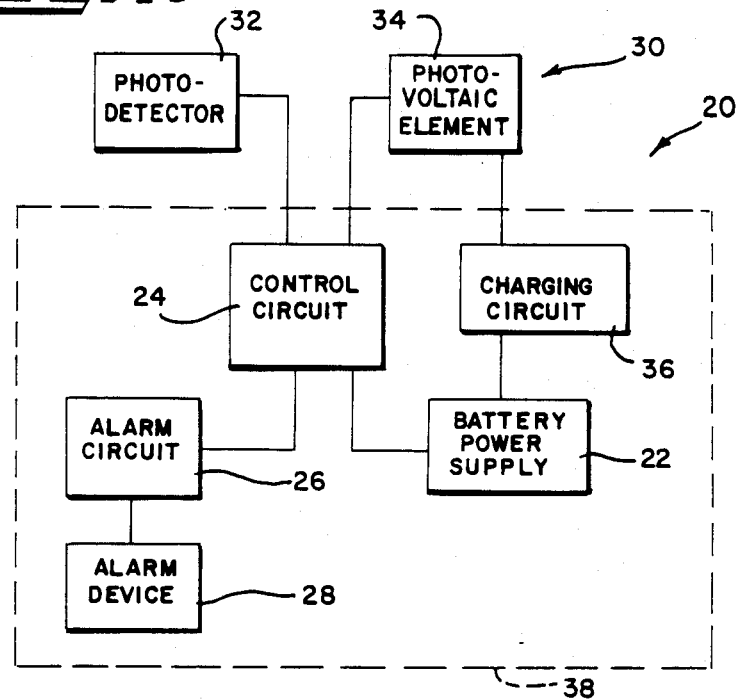
FIG. 1 is a functional block diagram of a rescue alarm system incorporating features of the present invention.

Referring now to the drawing, and initially to FIG. 1, there is shown in functional block diagram form an alarm system generally designated by the reference character 20 and constructed in accordance with principles of the present invention. The system 20 is intended to be securely affixed to the person of a user, for example one of a group of people such as skiers or climbers who are exposed to the danger of avalanche. It should be understood that while the system 20 is described with reference to the avalanche rescue environment, principles of the present invention may be applied to rescue and emergency equipment having other purposes.

System 20 includes a battery power supply 22 including one or a number of rechargeable batteries. An advantage of the system 20 is that it is conveniently portable, and the power supply is light enough in weight and is small enough in size to meet this goal.

A control circuit 24 is connected between the power supply 22 and an alarm circuit 26. One function of the control circuit 24 is to maintain the alarm circuit 26 normally in an unenergized condition. As a result, the power drain on the power supply 22 is minimized. An alarm device 28 is connected to the alarm circuit 26. In the event of an emergency condition, the control circuit 24 energizes the alarm circuit 26 by connecting it to the power supply 22 and the alarm device 28 is operated. Due to the low normal power drain on the power supply 22, the alarm device may be a high power consumption device such as a relatively high powered radio transmitter or a loud audible alarm, or both.

In accordance with a feature of the present invention, there is provided a triggering system generally designated as 30 for operating the control circuit 24 in the event of burial of the user in snow during an avalanche. The high reliability of the triggering system 30 in discriminating between snow burial and other conditions that may be encountered in a snowy alpine environment makes it practical for the control circuit to normally limit power consumption to a small value sufficient only to operate the triggering system. The charge on the power supply is not depleted by continuous energization of a signal transmitting device.

The triggering system 30 includes a pair of light responsive elements 32 and 34 each connected to the control circuit 24. Both of the elements 32 and 34 have a characteristic that changes in dependence upon the presence or absence of light. If the user is buried in snow, neither element 32 or 34 is illuminated, and this condition is detected in the control circuit 24 to trigger the alarm circuit 26 and alarm device 28. The use of two light responsive elements provides a redundant operation that reliably prevents triggering of an alarm if only one but not both of the elements is blocked from light.

In the embodiment of the invention illustrated in FIG. 1, the element 32 is a passive photodetector such as a photosensitive variable resistor. The other element 34 is a photovoltaic element or solar panel that develops a voltage when illuminated. A charging circuit 36 is connected between the photovoltaic element 34 and the battery power supply 22 to maintain the charge of the power supply during the normal, illuminated condition of the element 34. If desired, the charging circuit may be omitted and the power supply may be replenished by battery replacement or by charging during periods of non use.

Preferably, a protective enclosure 38, indicated by broken lines in FIG. 1, contains and protects the elements of the system 20 other than the elements 32 and 34. Preferably, the power supply 22, the circuits 24, 26 and 36 and the alarm device 28 are mounted in a small rigid case.

Figure 2:
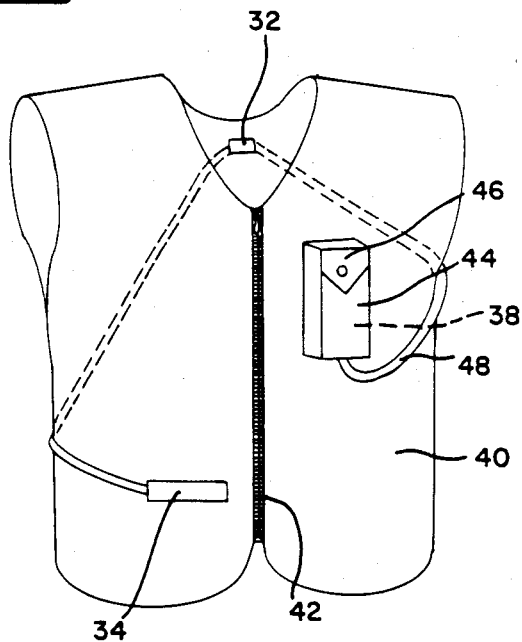
FIG. 2 is a perspective view of a user garment provided with an alarm system such as that shown in FIG. 1.

In FIG. 2 the elements of the alarm system 20 are shown incorporated with a user garment 40. A preferred form of garment is a vest made of a mesh material that is light in weight and does not act as a thermal barrier. The vest can be provided in a single size to fit any user, and can be worn with minimum inconvenience and discomfort over other garments. Since it is important in event of an avalanche that the user not become separated from the vest 40 and the system 20, a secure closure 42 is provided at the front of the garment. Other types of garments may be provided if desired, such as a jacket, suit, harness, belt or the like. If required to prevent blocking of the element 32 by a pack, the garment may be provided with a collar and the device 32 may be secured near the user's neck.

Photosensitive elements 32 and 34 are securely and permanently carried by the garment 40 at its exterior and are exposed to light incident upon the user. Element 32 may be any readily available, inexpensive, small sized photoresistive device. Preferably, the photovoltaic element 34 is a flexible panel with a surface area of about five to twenty inches. A panel of this size provides sufficient power in normal lighting conditions to maintain the charge of the power supply 22. Solar panels of this type, formed of a flexible stainless steel film or foil substrate carrying a photovoltaic layer protected by a durable elastomeric layer are available from Sovonics Solar Systems of Troy, Mich., U.S.A.

Since the alarm system may be used in snowy conditions, a single element such as the element 34 may become blocked from ambient light by adhering snow. In addition, one of the elements 32 or 34 may be darkened temporarily due to other causes. As indicated above, the use of two devices enhances the reliability of the alarm system through redundancy. To maximize the reliability, it is preferred that the two elements be spaced apart from one another to decrease the likelihood that both are simultaneously blocked. As shown in FIG. 2, one device is secured to the front of the user while the other is secured to the back.

Garment 40 is provided with a sturdy pocket 44 to receive the enclosure or case 38. A retention flap 46 closes the pocket 44 so that the enclosure 38 cannot be separated from the user, even under severe avalanche conditions. If desired an additional tether within pocket 44 can be employed to attach the enclosure 38 to the garment 40.

A cable 48 is incorporated into the garment 40 to provide the necessary electrical connections between the enclosure 38 and the photosensitive elements 32 and 34. Cable 48 extends into pocket 40 and is connected to the enclosed components of the system 20 by a releasable terminal system. The enclosure 38 can be disconnected from cable 48 and removed from the garment 40 when not in use for repair or replacement. An end portion of cable 48 within the pocket 44 is of sufficient length to permit the enclosure 38 to be removed from the pocket for use without disconnecting the cable 48.

Should an avalanche bury one or more members of a group ("victims"), the remaining members of the group ("survivors") can quickly locate the victims using the alarm system 20. If the alarm device 28 takes the form of an audible alarm, the survivors can listen and locate victims beneath the surface of the snow. Available power from the power supply is ample for a loud alarm signal that can be heard through several feet of snow. The direction of the source of the audible alarm can easily be detected. The alarm device 28 may also take the form of a radio transmitter as described below. In this case, the survivors may detect the location of the victims with directional finding capability because the triggering system conserves battery power for emergency use.

Referring now to FIG. 3, there is shown an alarm system generally designated as 500 comprising a further embodiment of the present invention. System 500 includes a microprocessor 502 for controlling the operation of the system 500, a GaAs FET microwave frequency section 504 connected to antennas 506, 508 and 510, and a VHF transceiver circuit 512 connected to an antenna 514. A control bus 516 couples digital control signals supplied by the microprocessor 502 to the microwave frequency section 504 and a display 518.

Each member of a group exposed to the possibility of avalanche danger may be provided with a system 500. The illustrated components of the system are preferably housed in a case such as the enclosure 38 described above and the case is secured to the person of the user, preferably in the pocket 44 of a garment such as the vest 40 described above. The system 500 normally operates in a standby mode. In the event that one or more users are buried in an avalanche, the systems 500 of each victim then operate in a transmit mode while the systems 500 of each survivor then operate in a receive mode. The transmit and receive modes are synchronized and controlled by the microprocessor 502 as described below. A trigger signal resulting from snow burial of any user causes the system 500 of that user to switch to the transmit mode, and an alarm signal transmitted by that system 500 causes the systems 500 of the survivors to operate in the receive mode.

Proceeding to a more detailed description of the components and operation of the alarm system 500, the microwave frequency section 504 is preferably a galium arsenide integrated circuit incorporating field effect transistors operable at microwave frequencies. Section 504 includes an oscillator 520 for generating a microwave frequency used for transmitting an alarm signal in the transmit mode and used for demodulating received signals in the receive mode. The preferred signal frequency of the oscillator 520 is in the four to eight gigahertz range, specifically 5.8 gigahertz. Radio signals of this frequency are not greatly attenuated by snow and antennas of a convenient small size may be used for transmission and reception. Preferably, the oscillator 520 is a dielectrically stabilized resonator.

The oscillator 520 is coupled through a FET switch 522 alternately to the input of an RF amplifier 524 or to one input of an FET mixer circuit 526. The output of amplifier 524 is connected through a FET switch 528 either to antenna 506 or to the second input of the mixer circuit 526. A FET switch 530 alternately connects the antenna 508 or the antenna 510 to the microwave frequency section 504. A FET switch 532 connects either the switch 528 or the switch 530 to the second input of the mixer circuit through a variable attenuation circuit 534 including a pair of attenuators 536 and 538 controlled respectively by FET switches 542 and 544. Attenuators 536 and 538 may, for example, be resistive T pads with 50 ohm input and output impedence.

The output of the mixer circuit 526 is connected to the input of a detecting log video amplifier 544. The output of the amplifier 544 is connected to the non grounded analog signal port VI+(pin 6) of an A/D (analog to digital) converter 546. Eight bit digital output signals are coupled from data bit lines DB0–DB7 (pins 11–18) of the A/D converter to the eight bit data port 0, P0.0–P0.7 (pins 32–39) of the microprocessor 502.

Control signals generated by the microprocessor 502 are applied to the control bus 516 through port 2, lines 3–7, P2.2–P2.7 (pins 23–28) of the microprocessor 502. Lines 1 and 2 of port 2, P2.1–P2.2 (pins 21 and 22) are used to interrogate the A/D converter through lines CS and RO (pins 1 and 2). Other conventional connections to the microprocessor 502 such as clock signal inputs to lines X1 and X2 (pins 18 and 19), external RAM read-write connections through lines RD, WR and PSEN, and the like are not necessary to an understanding of this invention and are omitted for clarity.

Transceiver 512 is a VHF receiver and transmitter (transceiver) circuit connected between dipole antenna 514 and the RS232 TXD and RXD lines (pins 10 and 11) of the microprocessor 502. VHF signals are used for radio data information transmission between different ones of the systems 500. The preferred frequency generally in the range of ten to four hundred megahertz permits use of a relatively small and simple dipole antenna 514 to achieve relatively long range transmissions between units, and permits transmissions from the snow buried unit of a victim to the unit of a survivor on the surface.

In the normal standby condition, minimum power drain occurs. Power consumption is limited to that incident to maintaining the microprocessor 502 in standby operation in which periodic interrogation for a trigger signal takes place. The oscillator 520 and other components are not energized and do not drain the power supply of the system 500. When a trigger signal occurs due to snow burial, the trigger signal is applied to the microprocessor 502 of the system 500 of the victim. The microprocessor 502 then controls the transmission of an alarm from the victim to survivors. In this embodiment of the invention, the alarm is a complex of a first VHF data signal followed by synchronized microwave location signals. This complex signal serves to operate the system 500 of a survivor in the receive mode in synchronization with the transmit mode of the system 500 of a victim.

More specifically, when a victim is buried in snow, a trigger circuit 548 applies a trigger signal to the control bus 516. The microprocessor 502 is triggered by this detected emergency condition and, in response, a coded signal is transmitted by the VHF transmitter 512 and dipole antenna 514. Antenna 514 may be a small ferrite antenna enclosed within the case of the unit. Coded data included in this signal includes a data segment identifying the transmitting system 500, and thus the identity of the victim. The coded VHF signal also includes a timing or synchronization segment so that the survivor's system 500 properly receives and processes subsequent transmitted microwave location signals as described below. Additional information may be incorporated in the coded signal if desired.

In order to transmit microwave location signals, the microprocessor 502 of the victim closes contacts 522A and 528A of switches 522 and 528 to connect the oscillator 520 and amplifier 524 to the dipole antenna 506. This antenna may be a small antenna in the form of a printed path on a printed circuit board inside the case of the unit. The oscillator 520 is energized to transmit periodic bursts of microwave radiation, for example, 50 microsecond bursts at one-half second intervals. These bursts are in timed sequence with the transmitted VHF timing signal segment. Since transmission does not occur prior to an emergency, and occurs only in bursts even in the transmit mode, a relatively high power signal is possible. The preferred signal strength is about twenty milliwatts. The transmission from the dipole antenna 506 is substantially isotropic and is received by all systems 500 of survivors in the general vicinity of the victim.

During the emergency condition, the system 500 of any survivor operates in the receive mode. When a coded VHF signal is received from a victim, the microprocessor 520 of the survivor receives the VHF transmitted coded signal from the victim via the antenna 514 and VHF transceiver 518. The microprocessor 520 then applies a signal to the control bus 516 to operate an annunciator 550 to signal the survivor. The annunciator, for example, may include an audio frequency tone generator, amplifier and speaker. The user, upon hearing the annunciator signal, removes the system 500 from his or her pocket and commences hand held use of the unit to locate the victim. Information identifying the victim is extracted by the microprocessor 502 and may be displayed on the display 518.

The coded VHF signal received by the antenna 514 is used by the microprocessor 502 of the survivor to time synchronize the microprocessor 502 of the survivor with the microprocessor 502 of the victim. Thereafter, the microprocessor 502 of the survivor receives and processes the microwave signal bursts transmitted from the victim for rapid location of the buried victim.

During each 50 microsecond burst, the microprocessor 520 operating in receive mode energizes oscillator 520 for at least the duration of the burst. During each burst, an attenuation control operation is performed and a direction finding operation is also performed. Preferably, the attenuation control is carried out for the first 10 microseconds, followed by a 40 microsecond direction finding operation with 20 microseconds devoted to each antenna 508 and 510.

More specifically, initially contacts 522B and 528B are closed to couple a reference signal from the oscillator 520 and a received signal from the dipole antenna 506 to the inputs of the mixer circuit 526. Switch contacts 532A are closed to connect antenna 506 through the attenuation circuit 534. The amplitude of the received signal is measured, preferably at an intermediate frequency of 10 MHz., by the amplifier 544 and A/D converter 546. The microprocessor 502 controls switches 540 and 542 placing attenuators 536 and 538 in series with the antenna 506 as required to avoid operating the antennas 508 and 510 in a side lobe rather than a main lobe condition during the subsequent direction finding operation if the survivor is in close proximity to the victim.

After attenuation control, transmission is tested sequentially by antennas 508 and 510 during the remainder of each microwave frequency burst. The antennas 508 and 510 are geometrically related as described below so that a comparison of signal amplitudes received on the two antennas yields information from which the direction of the victim can be determined and displayed. The use of two antennas in a stationary mode provides an easy to use yet accurate direction finding capability under adverse conditions when the conventional rotary motion direction finding system is impractical.

More specifically, contacts 532B of switch 532 are closed to disconnect antenna 506 and enable alternate operation of antennas 508 and 510 under the control of switch 530. Contacts 530A are closed, for example for 20 microseconds, and then contacts 530B are closed for a similar time period. The microprocessor 502 analyzes the absolute and relative strengths of the signals received from the geometrically related antennas 508 and 510. If the absolute signal strength of the signals is below a given amount, a signal is coupled through the control bus 516 to the display 518 to indicate to the user that the antennas 508 and 510 should be aimed toward a different sector, requiring a relatively large movement of the system 500. The antennas 508 and 510 are effective for direction finding in a sector of about 45 degrees.

If the absolute signal strength is sufficiently large, direction finding information is derived from the relative signal strengths of the received signals. The antennas 508 and 510 are geometrically located so that if the received signals are equal, i.e., a null condition, this indicates that the array of antennas 508 and 510 is aimed directly at the victim. If there is a difference in signal strength, an indication is displayed of the direction of the victim in the scanned sector, or of the direction in which the antennas 508 and 510 should be moved to locate the victim in the aiming direction and produce a null condition.

An accurate null indication is provided by matching the antennas 508 and 510 so that signal strength differences result substantially only from the relationship of the transmission point to the main lobe pattern of each antenna. The received circuit signal paths within the system 500 are common except for the contacts of switch 530. The use of a GaAs FET solid state switch permits the signal paths to be identical within a small fraction of a decibel, compared to a total direction finder signal sensitivity of about four decibels.

The display 518 preferably comprises a liquid crystal diode array driven by digital signals received from the microprocessor 502. In addition to displaying character information, for example the identity of a victim from whom an alarm signal is transmitted, the display may also provide graphic information such as a pointer aimed by the microprocessor 502 in the direction from which an alarm signal is received. A user with a minimum of skill or experience can observe this pointer and, in response, aim the unit to quickly and accurately locate a victim.

With reference now to FIGS. 4–7, there is illustrated a user unit generally designated as 600 including the alarm system 500 of FIG. 3. Unit 600 includes a rigid and sturdy case 602 in which are mounted the electronic components and other components of the alarm system 500. Cable 48 is connected to the case 602 and includes conductors extending to the photo responsive devices 32 and 34 secured to garment 40. The case 602 is small and compact in order to fit in pocket 44. A cover 604 is movably mounted on the case 602.

A grille 606 is formed on the face of case 602 to permit sound transmission from the annunciator 550. Manual controls 608 and 610 are accessible on the front of the unit. For example, control 608 may be used to operate a switch for arming or disarming the alarm system 500 by controlling the application of power to the system. Control 610 may be used to control a switch for disabling the annunciator 550 following receipt of an alarm signal. Display 518 is visible near the top and front of the case.

Case 602 is generally rectangular and box-like in shape. Cover 604 has a corresponding but slightly larger shape to slide over the case with a telescoping movement. Cover 604 is open ended to permit this movement, but is preferably closed on the top and all four sides. In the closed or standby position (FIG. 6) the cover overlies and protects the grille 606, the controls 608 and 610 and the display 518. In the open or operating position (FIGS. 4 and 5), the cover overlies and protects the display 518 but permits access to the controls 608 and 610. Viewing of the display is permitted by forming the cover 604 of a transparent or translucent (non opaque) material such as molded plastic.

Normally the cover 604 is maintained in the standby, closed position by a latch system including a pair of outwardly spring biased latch buttons 612 located in opposed positions on the side of the case 602. Buttons 612 are received in latch openings 614 formed in cover 604 and movement of the cover to the operating, open position is positively prevented.

In order to permit use of the unit 600 by a survivor following an annunciator signal, the unit is taken in hand, and the buttons 112 are depressed. The use of two opposed buttons minimizes the risk of inadvertent unlatching of the cover. When the buttons move inward clear of the inner surface of the wall of the cover 604, the cover can move to the open position shown in FIGS. 4 and 5. In this position, the buttons 112 move to their outward positions and engage the bottom edge of the cover to hold the cover in the open position. A guide projection 616 received in a slideway 618 prevents movement of the cover 604 beyond the open position.

Antennas 508 and 510 are located above the case 602 and are enclosed by the cover 604 at all times. The antennas are physically matched to one another. Each antenna 508 and 510 is a length of conductive wire formed into a helix. This type of antenna has a number of advantages. One advantage is the directional characteristic of the field pattern. The main lobe of the pattern is symmetrical about the major axis of the helix and is substantially concentrated in an enclosed angle of about 25 to 30 degrees. Preferably, the antennas 508 and 510 are mounted in an array with their axes at an angle of about 20 degrees to one another. This provides an effective direction finding sector angle of about 45 degrees. For an operating frequency of 5.8 gigahertz, it is preferred that each antenna have a length (see FIGS. 4 and 5) of about 5 inches, a pitch of about 12.5 degrees and a diameter of approximately one-third wavelength, about 0.65 to 0.75 inch.

Another advantage of the helical shape of antennas 508 and 510 is that the antennas 508 and 510 can assume compact retracted positions (FIG. 6) and, alternatively, extended operating positions (FIGS. 4 and 5). This permits the unit 600 to be compact in size and convenient to carry in the standby condition, yet provides an effective direction finding antenna array in emergency use. It is a feature of the invention that movement of the antennas 508 and 510 between the retracted and extended positions is simultaneous with movement of the cover 604 between the standby and operating positions. When the cover closes, the antennas 508 and 510 are retracted by the cover. When the cover opens, the antennas 508 and 510 are extended.

A further advantage of the helical shape of the antennas 508 and 510 is that they serve as springs for moving the cover 604 to the open position when the cover is unlatched. Each antenna is made of a suitable spring wire, such as stainless spring steel. Antenna skin effect is significant at the frequency of operation of the antennas 508 and 510. To reduce the impedance of the wire surface a plating such as gold or gold alloy may be used. This plating also provides corrosion resistance and long life of the antennas.

The bases of the antennas 508 and 510 are socketed in the top wall of the case 602 and are connected to the microwave frequency section 504 of the system 500.

The wire is chosen so that each antenna provides a spring force of about 5 to 10 pounds for opening the cover 604 when the latch buttons 612 are depressed. This force is sufficient to assure automatic opening, and small enough to permit the cover 604 to be pushed closed when the buttons are again depressed. When the closed position is reached, the latch buttons 612 snap into the latch openings 614.

Figure 8:
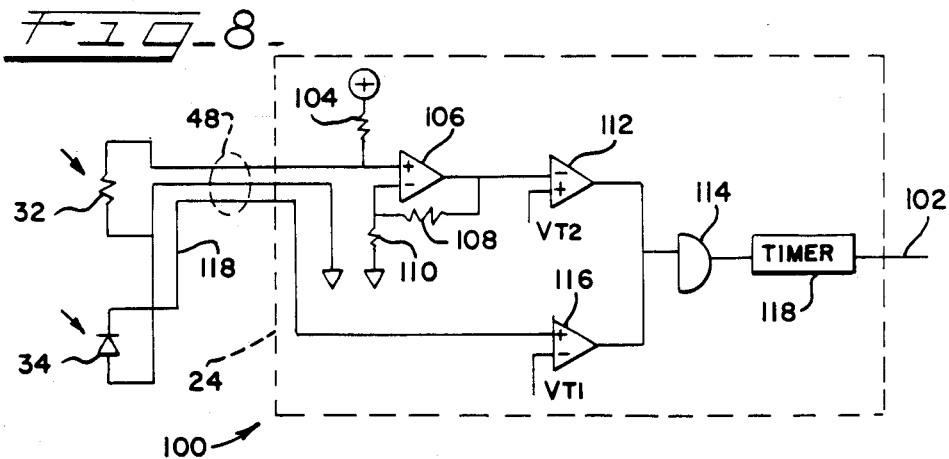
FIG. 8 is a schematic view of a trigger circuit constructed in accordance with the invention.

FIG. 8 illustrates a trigger circuit generally designated by the reference character 100 constructed in accordance with the features of the present invention. The circuit 100 includes the photosensitive variable resistor, or photoresistor, 32 and the photovoltaic element 34 connected by cable 48 (FIG. 2) to the control circuit 24 illustrated in FIG. 1. When the user of an alarm system incorporating the trigger circuit 100 is buried in snow, the circuit 100 provides an output or trigger signal at an output line or terminal 102. The circuit 100 may be used with various alarm systems. In the alarm system 20 of FIG. 1, the output is coupled to the alarm circuit 26. If used with the system 500 of FIG. 3, the trigger signal is coupled to the microprocessor 502 to initiate the alarm or transmit operation of the system 500 carried by the buried user.

Photoresistor 32 is connected by cable 48 in a voltage divider circuit including a resistor 104. The output of the divider is connected to the plus input of a non inverting operational amplifier 106. In the normal, illuminated condition of the photoresistor 32, it has a relatively low resistance. If the photoresistor 32 is darkened by burial of the user in snow, the resistance of the photoresistor 32 increases. The output of the voltage divider is compared to the minus input of operational amplifier 106 coupled to a feedback resistor 108 and bias resistor 110. Low resistance of photoresistor 32 results in an increased voltage applied to the minus input of an operational amplifier 112 connected as a comparator. A reference voltage V T2 at the plus terminal of comparator 112 is compared with the output of the operational amplifier 106, and a relatively negative signal is applied from the output of comparator 112 to one input of an AND gate 114.

Photovoltaic element 34 is coupled through cable 48 to the plus input of an operational amplifier 116 connected as a comparator by a lead or conductor 118. The voltage generated by illumination of the photovoltaic element 34 is compared to a reference signal V T1. If the voltage drops to a low level indicating burial in snow, a relatively low voltage signal is coupled from the output of comparator 116 to the second input of AND gate 114. If desired, two photoresistors or two photovoltaic elements may be used instead of one of each along with corresponding branches of the trigger circuit 100.

When either of the devices 32 and 34 is illuminated, the corresponding input of gate 114 is at a relatively high level. When both inputs or either input is at a high level, a high level output is coupled from the output of the gate 114 to a timer 118. When timer 118 receives a high input, no trigger signal is present at the output 102.

If both inputs of gate 114 are negative, indicating darkening of both devices 32 and 34, the output of gate 114 becomes negative. The negative input to timer 118 initiates a time delay period, for example 30 seconds, to minimize false triggering. At the end of the time delay, the timer 118 applies a trigger signal to the output 102 of circuit 100. This provides a fail safe operation minimizing the possibility that an unaware user may be buried with an inoperative alarm system. If either device 32 or 34 fails or is disconnected, a low voltage present at the plus input of operational amplifier 106 or at the plus input of comparator 116 will result in a low signal at the corresponding input of gate 114. As one example, if cable 48 is inadvertently disconnected or damaged, a trigger signal occurs and the user is aware of the fact that the alarm system is not functioning.

Figure 9:
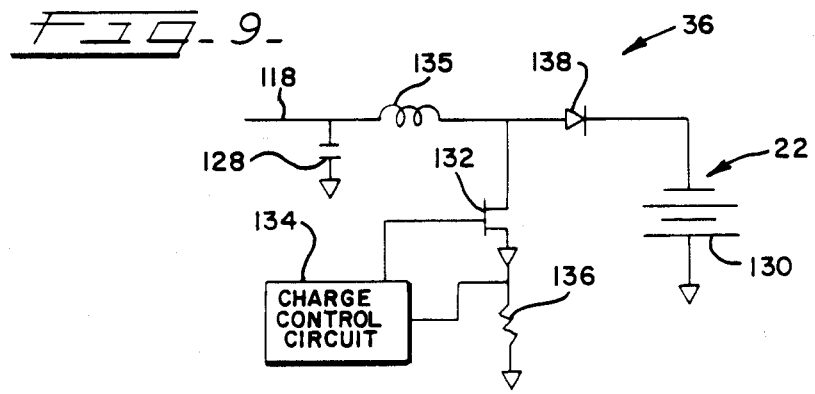
FIG. 9 is a schematic view of a battery charging circuit for an alarm system of the invention.

FIG. 9 illustrates the battery charging circuit 36 of the alarm system 20 of FIG. 1. This charging circuit may be used with other types of alarm systems including those illustrated in FIGS. 3 and 10. The input of the charging circuit 36 is connected to the non grounded side of photovoltaic element 34 by conductor 118 of cable 48 (see FIGS. 2 and 8) and is connected to ground by a capacitor 128. The output of circuit 36 is connected to the positive side of a six volt storage battery 130 included in battery power supply 22.

A VMOS or TMOS field effect transistor 132 is controlled by a charge control circuit 134 to maintain a predetermined charge level on battery 130. Charge control circuit 134 is connected to the gate of the FET 132 and normally holds it in a conductive condition. Current generated by the photovoltaic element 34 flows through an inductor 135, through the output circuit of the FET 132, and to ground through a resistor 136. Capacitor 128 is charged to a voltage corresponding to the output voltage of the photovoltaic element 34.

A battery voltage sensing signal is applied to the charge control circuit 134 from the junction of the drain of FET 132 and resistor 136. If this sensing signal indicates that battery voltage is below the predetermined level, the charge control circuit supplies a signal to the gate of FET 132 to turn the FET off and then on. When FET 132 is turned off, the inductor 135 causes current to continue to flow. This current flows through a diode 138 to the battery 130, recharging the battery. The recharging operation continues in cyclic fashion until the battery charge reaches the predetermined level. The use of an inductive charging circuit permits charging the battery to a voltage larger than the voltage generated by the photovoltaic element 34. The charge control circuit 134 may take the form of a logic device. For example, if the charging circuit 36 is used with the alarm system 500 of FIG. 3, the microprocessor 502 may perform the control functions for the FET 132.

Figure 10:
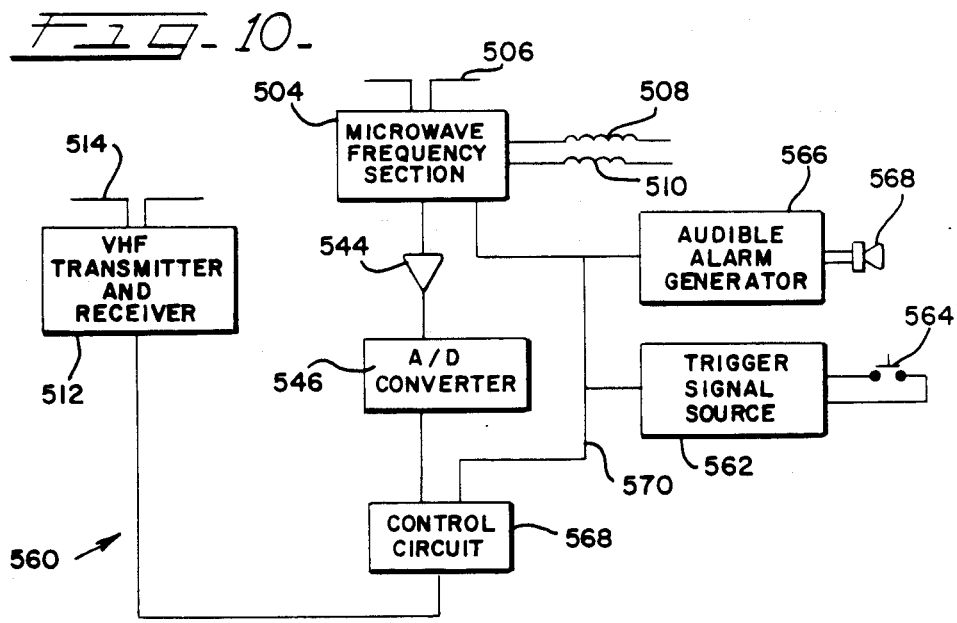
FIG. 10 is a functional block diagram of another alarm system constructed in accordance with the present invention.

In FIG. 10 there is illustrated in functional block diagram form an alarm system generally designated as 560 comprising another embodiment of the present invention. In some respects the system 560 is similar to the system 500 illustrated in FIG. 3 and described above. Some of the components of systems 500 and 560 are the same, and are designated by the same reference characters. Reference may be had to the description of system 500 for further information about those components.

System 560 differs in two significant respects from system 500 described above. One difference is that it includes a trigger signal source 562 that is operated manually rather than by detecting snow burial of a user. The trigger circuit 100 of FIG. 8 may, in accordance with the invention, be replaced with or supplemented by the source 562. Source 562 includes a manually operable switch 564 that is intended to be operated by a surviving user following burial of other users. This results in transmission of a trigger signal to the systems 560 of buried users that acts in place of or in addition to a trigger signal from the trigger circuit 100 for operating the system 560 of a victim in the alarm or transmit mode.

An advantage of this arrangement is that, if trigger signal source 562 is used in place of the trigger circuit 100, a simpler and less expensive arrangement is possible. In this instance, the photo sensitive devices 32 and 34, along with the associated cabling and the like, are not required. Another advantage, when the source 562 is used to supplement the circuit 100, is that redundant sources of trigger signals are present in the system.

Another difference between the systems 500 and 560 is that the system 560 is provided with an audible alarm generator 566. The generator 566 includes an audio frequency tone generator and amplifier as well as a speaker or other transducer 568 for coupling an audible alarm, either continuous or intermittent, from the system 560 of the victim into the snow. An audible alarm can be heard by a survivor from several feet away and through several feet of snow. Thus, an audible alarm may be very useful at close range.

The audible alarm generator 566 may be used together with the microwave frequency section 504 of FIG. 3 to supplement the victim locating performance of the system. Alternatively, the generator 566 may be used alone, in place of the microwave frequency section 504 for a low cost, close range victim location system.

The alarm system 566 includes a control circuit 568 coupled by a control bus 570 to the microwave frequency section 504, the audible alarm generator 566 and the trigger signal source 562. The control circuit 568 may be a microprocessor similar to the microprocessor 502 described above, and the bus 570 may be a multiple line bus similar to the control bus 516 capable of coupling digital signals among the various components of the system 560.

In operation, each member of a group subject to avalanche danger carries a system 560, for example in a case or enclosure such as described above. In the standby condition, power drain is minimal since the only power consumption is due to monitoring of the system 560 by the control circuit 568.

In the event that a user is buried in snow, any survivor operates the switch 564 of his or her unit. This operation is detected by the control circuit 568, and the control circuit 568 transmits a trigger signal from the VHF transceiver 512 and dipole antenna 514.

When this trigger signal is received by the victim's system, the trigger signal is detected by the control circuit 568 of the victim. As a result, the audible alarm generator 566 is enabled and an audible alarm is sounded. In addition, a coded VHF signal may be transmitted by the VHF transceiver 512 and antenna 514 of the victim. As described above, the coded signal may include identity information and other data signals for synchronization, control and the like.

If the microwave frequency section 504 is employed as shown in FIG. 10, the antenna 506 is operated to transmit microwave frequency bursts. The alarm system 566 of the survivor uses these signal bursts as described in connection with the system 500 for attenuation control and direction finding functions.

While the present invention has been described with reference to details of the preferred embodiments shown in the drawings, such details are not intended to limit the scope of the invention as defined in the following claims.

We claim:

1. A rescue transceiver comprising:
   a case;
   manually operable control means disposed upon the surface of said case;
   antenna means mounted upon said case for movement between a retracted position and an extended position;
   a cover mounted over said case for normally enclosing at least a substantial portion of said case;
   said cover being movable relative to said case between a standby position in which said cover overlies said control means and an operating position in which said control means is exposed; and
   means for moving said antenna means from said retracted position to said extended position in response to movement of said cover from said standby position to said operating position.

2. A rescue transceiver as set forth in claim 1, further comprising indicator means disposed upon the surface of said case, said cover overlying said indicator means in both the standby and the operating positions of said cover, and said cover being at least partly non opaque.

3. A rescue transceiver as set forth in claim 2, said cover being transparent.

4. A rescue transceiver as set forth in claim 1, said antenna means being enclosed by said cover.

5. A rescue transceiver as set forth in claim 4 further comprising latch means engageable with said cover for releasably holding said cover in said standby position.

6. A rescue transceiver as set forth in claim 1, said antenna means comprising a direction finding antenna array.

7. A rescue transceiver as set forth in claim 6, said array including two matched helical antennas disposed at an angle to one another.

8. A rescue transceiver as set forth in claim 7, said helical antennas being springs biasing said cover toward said operating position.

9. An emergency rescue transceiver system including at least two similar system units, each said unit comprising:
   first radio transmitting means operating at a first frequency;
   second radio transmitting means operating at a second frequency;
   trigger means operable to produce a trigger signal indicative of an emergency condition;
   logic means coupled to said first and second transmitting means and to said trigger means for operating said first and second transmitting means in response to said trigger signal;
   said logic means including means for transmitting a first information signal through said first transmitting means; and
   said logic means including means for transmitting a second directional signal through said second transmitting means.

10. An emergency rescue transceiver system as claimed in claim 9, said first frequency being VHF and said second frequency being microwave.

11. An emergency rescue transceiver system as claimed in claim 10, said information signal including coded synchronization information.

12. An emergency rescue transceiver system as claimed in claim 10, said directional signal comprising timed bursts of isotropically radiated energy.

13. An emergency rescue transceiver system as claimed in claim 9, said first and second transmitting means each comprising a transceiver.

14. An emergency rescue transceiver system as claimed in claim 13, further comprising first and second antenna means coupled to said second transceiver and switch means for coupling said first and second antenna means alternatively to said second transceiver.

15. An emergency rescue transceiver system as claimed in claim 14, said first antenna means comprising an isotropic dipole and said second antenna means comprising a directionally aimed plurality of helical antennas.

16. A rescue radio system for receiving and processing emergency radio signals comprising:

microwave signal receiving means including a plurality of aimed helical antennas;

demodulating means;

switch means for alternatively coupling said antennas to said demodulating means;

processing means for comparing the relative strengths of signals received by said antennas; and indicating means for indicating the direction of the emergency radio signals relative to the antennas.

17. The rescue radio system of claim 16, further comprising attenuating means coupled to said antennas and said processing means including means for controlling said attenuating means in response to the absolute strength of the emergency radio signals.

18. The rescue radio system of claim 16 further comprising VHF signal receiving means, and means for synchronizing said switch means in response to a received VHF signal.

* * * * *